United States Patent
Seok et al.

(10) Patent No.: US 7,764,740 B2
(45) Date of Patent: Jul. 27, 2010

(54) FAST BLOCK MODE DETERMINING METHOD FOR MOTION ESTIMATION, AND APPARATUS THEREOF

(75) Inventors: Jin-Wuk Seok, Daejeon (KR); Yong-Ki Son, Daejeon (KR); Bum-Ho Kim, Daejeon (KR); Pyeong-Soo Mah, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1295 days.

(21) Appl. No.: 11/271,284

(22) Filed: Nov. 9, 2005

(65) Prior Publication Data
US 2006/0109905 A1    May 25, 2006

(30) Foreign Application Priority Data
Nov. 24, 2004    (KR) .................. 10-2004-0096852
May 30, 2005    (KR) .................. 10-2005-0045514

(51) Int. Cl.
*H04N 11/02* (2006.01)
*G06K 9/00* (2006.01)

(52) U.S. Cl. .................. 375/240.16; 375/287; 382/103

(58) Field of Classification Search ............... 382/100, 382/103, 181, 194, 232–235, 254, 274–275, 382/276; 703/2; 375/240.16, 240.03, 287
See application file for complete search history.

(56) References Cited

U.S. PATENT DOCUMENTS

| 6,115,420 | A  | * | 9/2000 | Wang .................... 375/240.03 |
| 6,993,462 | B1 | * | 1/2006 | Pavlovi et al. .................. 703/2 |
| 7,072,398 | B2 | * | 7/2006 | Ma ........................ 375/240.16 |
| 7,356,082 | B1 | * | 4/2008 | Kuhn ..................... 375/240.16 |
| 7,697,610 | B2 | * | 4/2010 | Yu et al. ................. 375/240.16 |

| 2004/0131121 | A1 | * | 7/2004 | Dumitras et al. ....... 375/240.16 |

FOREIGN PATENT DOCUMENTS

| KR | 2004-0035139 A | 4/2004 |
| KR | 2004-0064968 A | 4/2004 |
| KR | 10-2005-0061762 | 6/2005 |

(Continued)

OTHER PUBLICATIONS

Jing, X., et al, Fast approach for H.264 inter mode decision, Electronics Letters, pp. 1050-1052, vol. 40, Issue: 17, ISSN: 0013-5194, Aug. 19, 2004.

(Continued)

*Primary Examiner*—Seyed Azarian
(74) *Attorney, Agent, or Firm*—Blakely, Sokoloff, Taylor & Zafman LLP (57) ABSTRACT

A fast block mode determining method for motion estimation, and an apparatus thereof. A cost of motion estimation for an input image frame is predicted by Kalman filtering, and one block mode is selected from a plurality of block modes. A cost for the motion estimation of the input image frame is calculated. The predicted cost and the calculated cost are compared with each other, and the block mode for performing the motion estimation is determined. In an H.264 moving picture encoding device, the operation load is reduced and time wasted for calculation is shortened, because it is not necessary to perform the motion estimation for all the block modes.

16 Claims, 7 Drawing Sheets

FOREIGN PATENT DOCUMENTS

WO    WO 2004/064414 A    7/2004

OTHER PUBLICATIONS

Ahmad A. et al, Efficient block size selection in H.264 video coding standard, Electronics Letters, vol. 40, No. 1, Jan. 8, 2004, pp. 19-21. Publisher: IEE, UK.

Belfiore S.,et al. Spatiotemporal error concealment with optimized mode selection and application to H.264, Signal Processing: Image Communication vol. 18, No. 10, pp. 907-923 (2003).
Electronics Letters, Aug. 19, 2004, vol. 40, No. 17, 2 pages.
Electronics Letters, Jan. 8, 2004, vol. 40, No. 1, 2 pages.
Signal Processing: Image Communication 18 (2003) pp. 907-923.

* cited by examiner

FAST BLOCK MODE DETERMINING METHOD FOR MOTION ESTIMATION, AND APPARATUS THEREOF

CROSS-REFERENCE TO RELATED APPLICATION

This application claims priority to and the benefit of Korean Patent Application No. 10-2004-0096852 filed in the Korean Intellectual Property Office on Nov. 24, 2004, and Korean Patent Application No. 10-2005-0045514 filed in the Korean Intellectual Property Office on May 30, 2005, the entire contents of which are incorporated herein by reference.

BACKGROUND OF THE INVENTION (a) Field of the Invention

The present invention relates to a fast block mode determining method for motion estimation, and an apparatus thereof.

(b) Description of the Related Art

Moving picture technology is being utilized in video conferencing, high definition television, video on demand (VOD) receivers, personal computers supporting MPEG (moving picture experts group) images, game tools, terrestrial digital broadcasting receivers, digital satellite broadcasting receivers, cable television, etc. Moving picture data needs to be compressed because its amount of data is greatly increased in digitalizing an analogue signal. A moving picture is formed of a plurality of frames, and similarities exist between neighboring frames or between blocks or pixels in the same frame. This similarity of the image signal enables predictive encoding of the image, so that a highly efficient image signal compression may be performed.

Generally, there are three kinds of image data compression methods. These are i) a temporal redundancy reducing method, ii) a spatial redundancy reducing method, and iii) a statistical characteristic of code utilizing method. A motion estimation and compensation method is a representative example of the temporal redundancy reducing method, and this is adopted and utilized in most moving image compression standards such as MPEG and H.263.

The motion estimation method shows substantial performance in reducing a bit ratio by eliminating temporal redundancy in moving image encoding. The motion estimation method may be largely divided into a pixel-based matching scheme and a block-based matching scheme. Generally, since motion is expressed by a large block unit, the block-based estimation method is broadly used.

According to the block-based estimation method, an image is divided into several blocks having the same size, and a block which is best matched with a current block is searched for in previous image blocks. Here, a motion vector corresponding to a difference between the current block and the searched block is calculated and encoded, so that the motion estimation may be performed. When evaluating a match between the blocks, various matching functions may be utilized, and the generally used scheme is to utilize an SAD (sum of absolute difference) which is a sum of absolute values of differences between pixels of the two blocks.

However, a moving picture encoding device of the H.264 standard uses a cost function based on rate-distortion optimization instead of the conventional scheme based on the SAD. Unlike conventional moving picture encoding schemes based on large 16×16 or 8×8 blocks, the H.264 standard uses 8 different kinds of block modes, and selects a mode having a minimum value among the block modes in order to obtain high compression efficiency and high image quality. In other words, the H.264 standard provides variable-block-based motion estimation of various block sizes. This provides many advantages in encoding efficiency. In addition, according to the H.264 standard, a motion vector prediction based on a quarter-pixel is performed, so that more accurate motion estimation may be enabled and encoding efficiency may be increased. However, compared with other encoding schemes, while encoding efficiency may be increased by using a quarter-pixel search, a minimum of 16 times more motion estimation operations need to be performed. This is the main reason for speed falloff in H.264 video encoding.

Therefore, efforts to reduce the motion estimation time, which is the most time-consuming process in moving picture encoding, are still ongoing.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a fast block mode determining method for motion estimation and an apparatus thereof, having advantages of reducing time and quantity of operations by using a Kalman filter.

An exemplary motion estimation method for moving picture encoding according to an embodiment of the present invention includes the following steps a), b), c), and d). In step a), a cost of motion estimation for an input image frame is predicted. In step b), a certain block mode is selected from a plurality of block modes used in motion estimation, and a cost for motion estimation for the input image frame is calculated. In step c), the predicted cost is compared with the calculated cost. In step d), the certain block mode is determined as a block mode in which the motion estimation is to be performed, and then the motion estimation is finished, when the calculated cost is smaller than the predicted cost.

In a further embodiment, in step a), the cost prediction is performed by Kalman filtering. In another further embodiment, the method further includes step e). In step e), another block mode is selected from the plurality of block modes and a cost for the motion estimation is calculated, when the calculated cost is larger than the predicted cost.

In a still further embodiment, steps c) to e) are repeated until the block mode for the motion estimation for the input image frame is determined.

In a still further embodiment, the method includes step f). In step f), the predicted cost is renewed by applying the cost calculated for the determined block mode to the Kalman filtering, when the block mode for the motion estimation for the input image frame is determined.

In a still further embodiment, the renewed predicted cost is used as a predicted cost value for a next input image frame.

An exemplary motion estimation device according to the present invention includes a motion estimator and a block mode determining unit. The motion estimator selects one block mode from a plurality of block modes used in motion estimation for an input image frame, estimates a motion vector based on the selected block mode, and calculates a cost for the motion estimation. The block mode determining unit includes at least one Kalman filter. The block mode determining unit predicts a cost for the motion estimation for the input image frame, compares the cost calculated by the motion estimator with the cost predicted by the Kalman filter, and selects a block mode for performing the motion estimation according to the result.

In a further embodiment, the motion estimator includes a main pixel estimation module and a sub-pixel estimation module. The main pixel estimation module estimates a motion vector of a main pixel unit for the input image frame. The sub-pixel estimation module estimates a motion vector of a half-pixel unit or quarter-pixel unit with reference to the motion vector of a main pixel unit.

DETAILED DESCRIPTION OF THE EMBODIMENTS

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Figure 1:
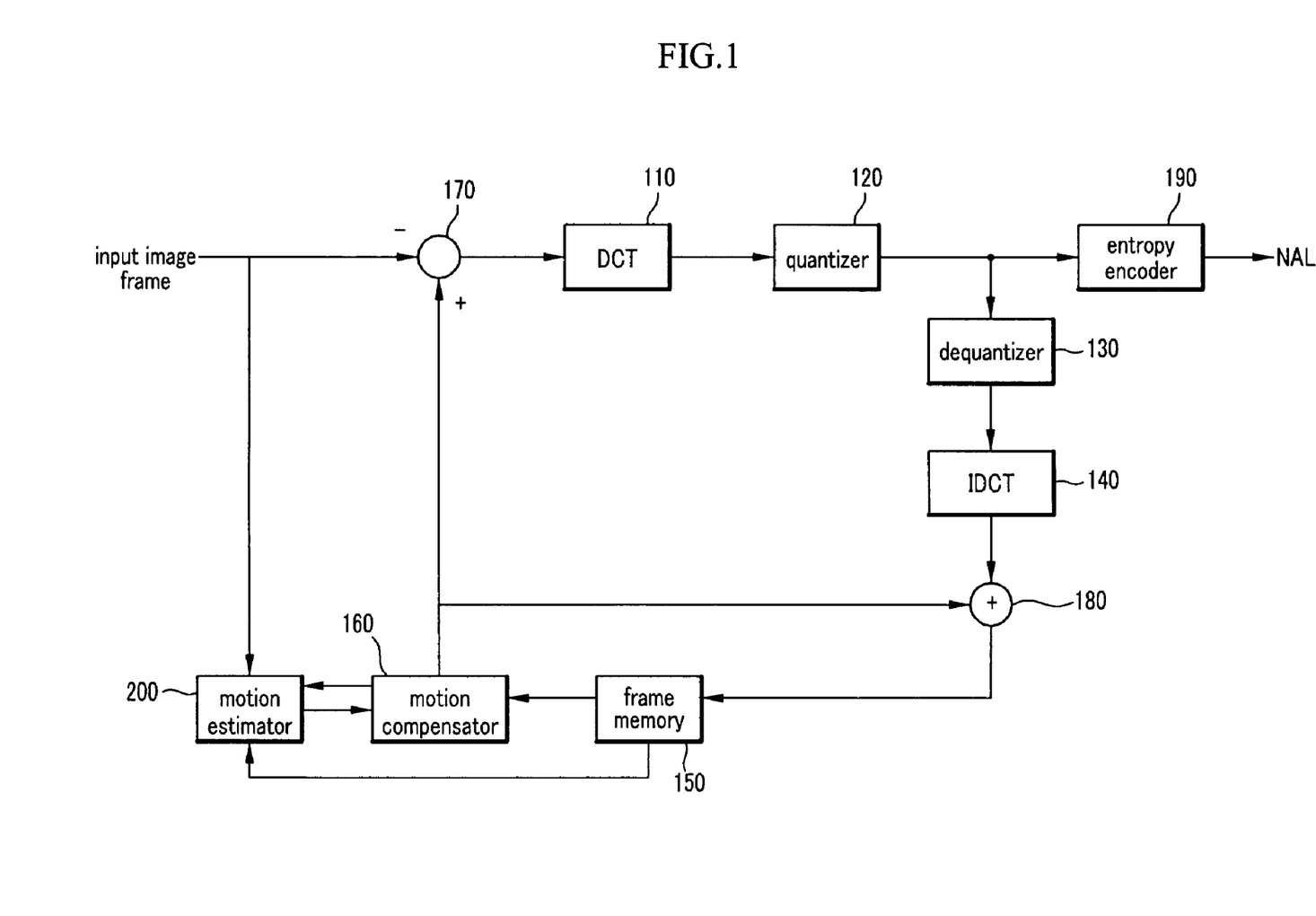
FIG. 1 is a block diagram illustrating a moving picture device according to an exemplary embodiment of the present invention.

FIG. 1 is a block diagram illustrating a moving picture device according to an exemplary embodiment of the present invention. As shown in FIG. 1, the moving picture device according to an exemplary embodiment of the present invention includes a discrete cosine transform (DCT) operator 110, a quantizer 120, a dequantizer 130, an inverse discrete cosine transform (IDCT) operator 140, a frame memory 150, a motion compensator 160, a subtractor 170, an adder 180, an entropy encoder 190, and a motion estimator 200. Here, the motion picture encoding device shown in FIG. 1 may be an encoding device of the H.264 standard, and hereinafter, an embodiment of the present invention will be described based thereon.

An image frame input based on a macro block is transformed into a block-based image frame by the DCT operator 110, and is quantized by the quantizer 120.

The image frame quantized by the quantizer 120 is decoded through the dequantizer 130 and the IDCT operator 140, and the decoded data is input to the adder 180. The data is restored to a real image, and is stored in the frame memory 150. Here, the stored image is provided as a reference image for motion estimation. The restoration of an image frame will be described later in a description of the motion compensator 160.

The motion estimator 200 performs motion estimation for a currently input macro block-based image frame with reference to at least one reference image stored in the frame memory 150. According to a result of the motion estimation, the motion estimator 200 outputs motion data including a motion vector, an index representing the reference image, and block mode information.

With reference to the motion data input from the motion estimator 200, the motion compensator 160 extracts a macro block-based image frame, which corresponds to a currently input macro block, from the reference image stored in the frame memory 150, and outputs the extracted image frame. The data output from the motion compensator 160 is input to the adder 180, and it allows the decoded data input to the other end of the adder 180 to be restored to a real image and to be transmitted to the frame memory 150.

The subtractor 170 receives a macro block in the reference image, which corresponds to the input macro block, from the motion compensator 160, performs a difference operation with the input macro block, and outputs a residual signal, when interframe predictive coding is performed for the macro block input to the motion picture encoding device.

The output residual signal is transformed and quantized by the DCT operator 110 and the quantizer 120, is entropy-encoded by the entropy encoder 190, and is then output in the form of network abstraction layer (NAL) unit data.

The image frame data output from the entropy encoder 190 may be temporarily stored in a buffer (not shown) in order to control a bit rate.

Figure 2:
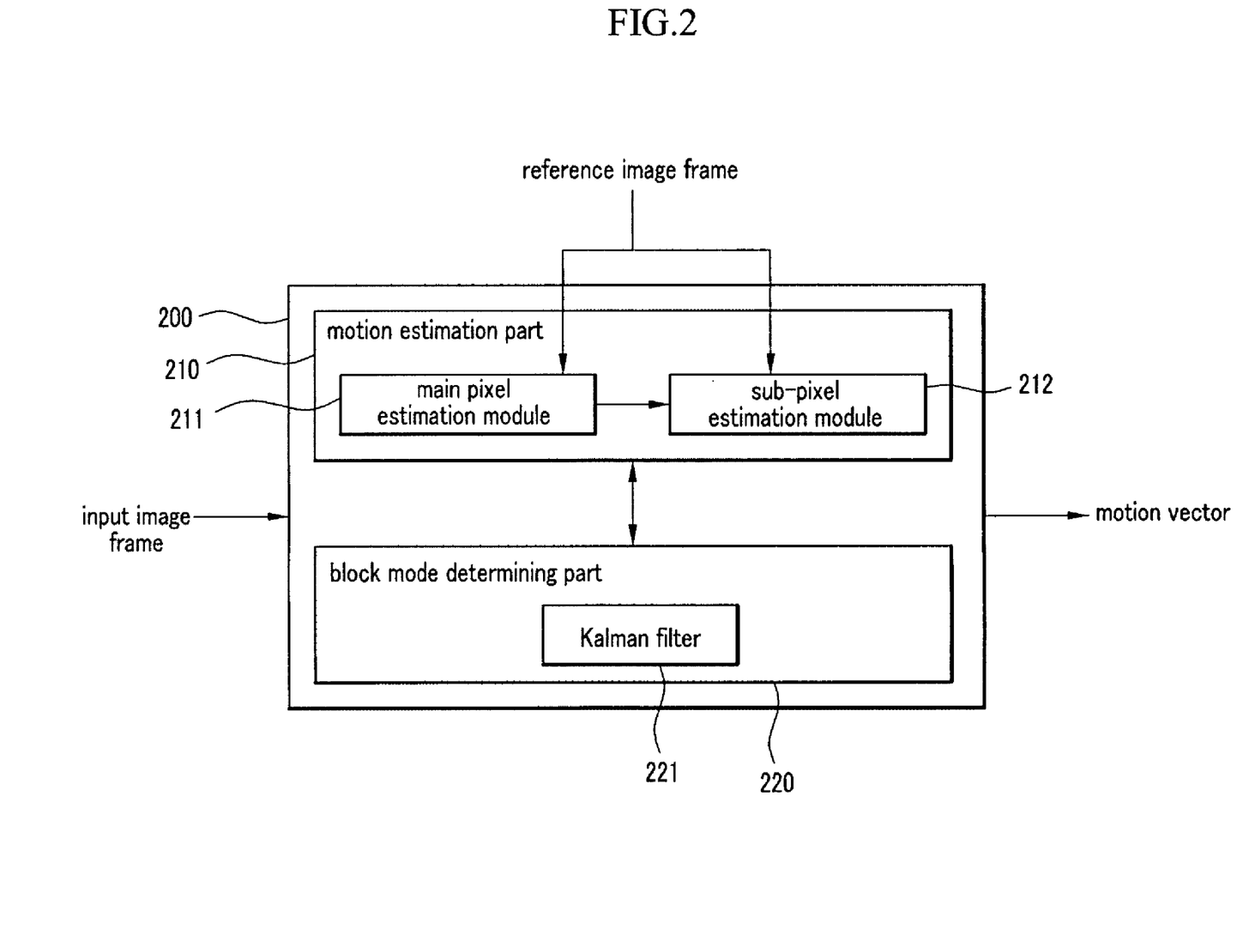
FIG. 2 is a block diagram illustrating a motion estimator according to an exemplary embodiment of the present invention.

FIG. 2 is a block diagram illustrating the motion estimator 200 according to an exemplary embodiment of the present invention. As shown in FIG. 2, the motion estimator 200 includes a motion estimation part 210 and a block mode determining part 220. The motion estimation part 210 includes a main pixel estimation module 211 and a sub-pixel estimation module 212, and the block mode determining part 220 includes a Kalman filter 221 for obtaining a predicted value of cost according to the motion estimation for each mode.

The motion estimation part 210 calculates a cost when encoding an input image frame by a certain block mode, and outputs the motion vector, which is estimated based on the calculated cost, to the motion compensator 160. Here, when the motion vector is output to the motion compensator 160, the index representing the reference image frame and the block mode information used for calculation of the motion vector are also output to the motion compensator together with the motion vector in the form of the motion data. They are obtained in a process of the motion vector estimation. Therefore, hereinafter, when terms such as "motion vector transmission" or "motion vector output" are used, they mean that the index representing the reference image frame and the block mode information used for calculation of the motion vector are also output or transmitted together with the motion vector in the form of the motion data.

The main pixel estimation module 211 divides the input image frame into predetermined sub-blocks, and searches a pixel region corresponding to a divided sub-block in the reference image frame. Based on a result thereof, the main pixel estimation module 211 estimates the motion vector, and outputs it. The main pixel estimation module 211 divides the input image frame by using 8 kinds of block modes (i.e., skip, 16×16, 16×8, 8×16, 8×8, 8×4, 4×8, 4×4), and estimates the motion vector by performing predictive encoding to the divided image frame for each block mode.

The sub-pixel estimation module 212 estimates optimal motion vectors for a half-pixel unit and quarter-pixel unit with reference to the motion vector of a main pixel estimated by the main pixel estimation module 211.

The motion estimation part 210 uses a cost function based on rate-distortion optimization rather than a conventional SAD-based search method in motion estimation. Here, the cost function uses a rate-distortion cost which is a sum of SAD and a value given by multiplying the Lagrangian multiplier to a number of encoded counts.

The rate-distortion cost is calculated with reference to the motion estimation result obtained through the main pixel estimation module 211 and the sub-pixel estimation module 212, and is transmitted to the block mode determining part 220.

The block mode determining part 220 uses the Kalman filter 221 for predicting cost. This is for selecting a block mode to be used in motion estimation of the input image frame. The block mode determining part 220 compares the cost calculated for a certain block mode which is transmitted from the motion estimation part 210 with the cost predicted by using the Kalman filter 221, and based on the result thereof, selects an optimal block mode for the input image frame. In more detail, when the cost predicted by the Kalman filtering is greater than the cost calculated for the certain block mode, the block mode determining part 220 selects the certain block mode to be the optimal block mode for the motion estimation. Then, the motion vector is calculated and the motion compensation is performed.

Figure 3:
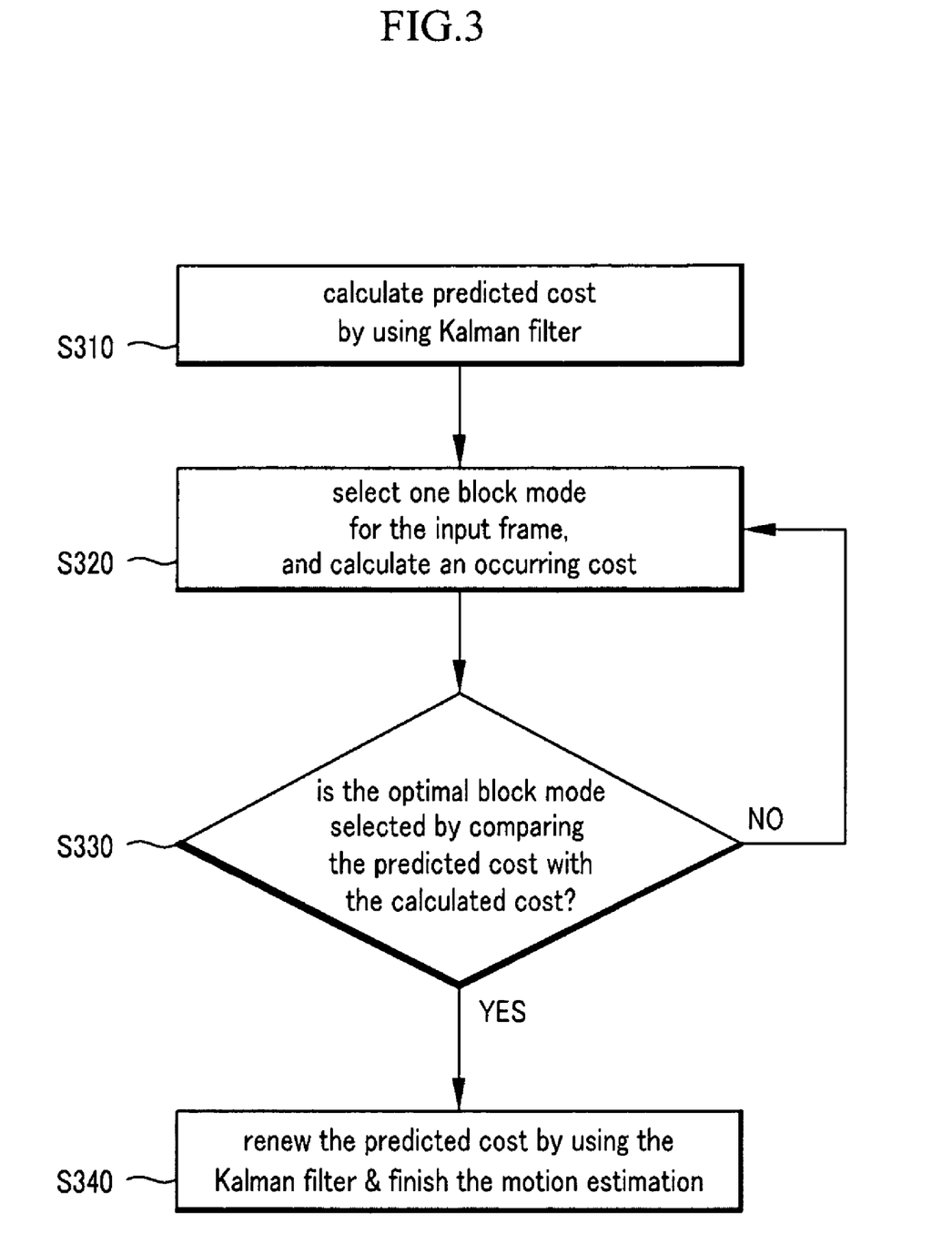
FIG. 3 is a flowchart illustrating a block mode determining method according to an exemplary embodiment of the present invention.

FIG. 3 is a flowchart showing a block mode determining method according to an exemplary embodiment of the present invention. Generally, in the H.264 standard, a block mode determination for the motion estimation is performed by a process in which respective costs for each block mode supported by the encoding device are calculated, and then a block mode having the minimum cost is selected. However, such a process causes an explosive increase of operation quantity, so that high speed encoding cannot be provided. Therefore, according to an exemplary embodiment of the present invention, the block mode is determined by properly predicting a range of cost of each mode, and calculating the minimum value of the cost.

When the moving picture encoding device is reset and an image frame is input for the first time, the Kalman filter 221 of the motion estimator 200 predicts a cost to be taken by a motion estimation of the input image frame in step S310.

The motion estimation part 210 selects one block mode for the input frame, and calculates an occurring cost when performing the motion estimation using the selected block mode in step S320.

Hereinafter, a cost calculation according to an exemplary embodiment of the present invention will be described. The cost function used in the motion estimation in the H.264 standard depends on not only the difference between blocks, but also a number of counts which are not "0". In other words, the cost function depends on the rate-distortion cost. Here, the count is derived from DCT and quantization. This is expressed as Equation 1.

$$J(X(t), X(t-1), M, \lambda, R) = D(X(t), X(t-1), M) + \lambda \cdot R(X(t), X(t-1), M)$$ [Equation 1]

In Equation 1, $X(t)$ represents a selected pixel in the currently input image frame for the motion estimation, and $X(t-1)$ represents a pixel which is input 1 unit duration before, and it corresponds to $X(t)$. $M$ represents a selected block mode corresponding to $X(t)$ and $X(t-1)$, and $\lambda$ represents the Lagrangian multiplier. Here, $\lambda$ may be a constant value, or may be a variable value to be calculated based on a quantization count of a corresponding image frame.

$D$ is a distortion function distinguished by $X(t)$, $X(t-1)$, and $M$. This is can be a sum of absolute difference (SAD) function, a mean square error (MSE) function, a sum of absolute transformed difference (SATD) function, or a sum of squared difference (SSD) function. $R$ is a rate function, and may be defined as a number of values which are not "0" when quantizing a DCT transformed value. P-block encoding of the H.264 standard is performed by a process of determining a motion vector and a block mode which minimize the rate-distortion function $J(X(t), X(t-1), M, \lambda, R)$.

The following Equation 2 to Equation 4 are used to obtain the minimum cost among the costs calculated by comparing the pixels in the currently input image frame with corresponding pixels of the reference image frame or the pixels of the previous image frame in each mode, and the obtained minimum cost for each block mode is estimated as the cost of each block mode.

$$B^\circ(EJ(\bullet,\bullet,M,\lambda),\epsilon) = \{J(\bullet,\bullet,M,\lambda) \| J(\bullet,\bullet,M,\lambda) - EJ(\bullet,\bullet,M,\lambda)\| < \epsilon\}$$ [Equation 2]

In Equation 2, $EJ(\bullet, \bullet, M, \lambda)$ represents an average of rate-distortion costs in one image frame. Equation 2 is given by applying a level set method for the motion estimation. According thereto, when selecting a certain block mode for every pixel in one image frame and calculating the rate-distortion cost for every pixel, not only the minimum rate-distortion cost but also every other rate-distortion cost is included in an open set having a certain range.

Here, the minimum rate-distortion cost of a certain block mode has a relationship as shown in Equation 3 and Equation 4.

$${}_M^{min} J(\bullet,\bullet,M,\lambda) \in B^\circ(EJ(\bullet,\bullet,M,\lambda), \epsilon)$$ [Equation 3]

In Equation 3, ${}_M^{min} J(\bullet, \bullet, M, \lambda)$ is given as Equation 4.

$$\forall_M J(\bullet,\bullet,M,\lambda) \in B^\circ(EJ(\bullet,\bullet,M,\lambda),\epsilon)$$

$$\exists_M^{min} J(\bullet,\bullet,M,\lambda) s.t. J(\bullet,\bullet,M,\lambda) > {}_M^{min} J(\bullet,\bullet,M,\lambda)$$ [Equation 4]

The motion estimation part 210 calculates ${}_M^{min}J(\bullet, \bullet, M, \lambda)$ for each block mode by using Equations 2 to 4, and transmits a respective result of the calculation as a cost of a respective block mode to the block mode determining part 220.

The Kalman filter 221 of the block mode determining part 220 compares the previously predicted cost with the calculated cost for the certain block mode transmitted from the motion estimation part 210. When the calculated cost is determined to be smaller than the predicted cost, the certain block mode is determined to be the optimal block mode for the motion estimation, in step S330. On the contrary, when the optimal block mode is not determined, the calculation of the cost for other block modes and the comparing with the predicted cost are repeatedly performed until the optimal block mode is determined in step S320 and S330.

When the optimal block mode is selected, the predicted cost is renewed by using the cost calculated for the certain block mode as a new input value for the Kalman filter, and the motion estimation for the current image frame is finished, in step S340. Here, the renewed predicted cost is used in determining a block mode for the next input image frame.

Hereinafter, a cost prediction and a renewal thereof using the Kalman filtering will be described.

The Kalman filtering is an optimal state estimation process which may be applied to a dynamic system including an irregular disturbance. It uses a linear recursive algorithm for estimating an unknown variable of state of the dynamic system from a data including noise. The algorithm is generally used in estimation of a missile locus. In an exemplary embodiment of the present invention, the predicted cost for an image frame is calculated by using the Kalman filter, so that high speed block mode selection may be enabled. In order to select a block mode for the motion estimation of the input image frame, the block mode determining part 220 uses the Kalman filter 221 as a means for predicting the cost for each block mode.

The rate-distortion function may be assumed to have a characteristic of Brownina Process $W_M$ having a variance changing in real-time with reference to an average rate-distortion cost. This may be expressed by following Equation 5.

$$J(\bullet,\bullet,M,\lambda)=EJ(\bullet,\bullet,M,\lambda)+W_M \quad \text{[Equation 5]}$$

According to Equation 5, a rate-distortion function calculated for a certain block mode may be expressed as a function having time-varying variance. Since the Kalman filter is able to perform a process observation by eliminating a white noise in a probability process, the rate-distortion function in Equation 5 can be applied to the Kalman filter 221. This may be expressed by the following Equation 6.

$$X_{t+1}=X_t+L_t\cdot(Y_t-X_t) \quad \text{[Equation 6]}$$

In Equation 6, $X_t\bullet$ indicates $EJ(\bullet, \bullet, M, \lambda)$ which is estimated by the Kalman filtering in the motion estimation for the previous image frame, and $Y_t$ indicates the minimum cost $J(\bullet, \bullet, M, \lambda)$ which is calculated by Equation 1 to Equation 4 for the selected block mode. $L_t$ is an adaptive gain of the Kalman filter, and is given as $0.25\cdot(1-B_t(B_T-B_t))$ in order to find an average of $J(\bullet, \bullet. M, \lambda)$, which is a linear process. Here, $B_t\bullet$ represents a number of blocks in one frame in which the motion estimation is performed, and $B_T\bullet$ represents a number of whole blocks in one image frame.

The predicted cost calculated by Equation 6 is used in block mode determination of a latter input image frame.

According to the described exemplary embodiment of the present invention, a cost which is nearest to the cost predicted by the Kalman filter is calculated, and then a block mode corresponding to the calculated cost is selected as the block mode for the motion estimation. Then, no more additional motion estimation operations are necessary, therefore high speed block mode selection becomes possible. In this description, the block mode determining part 220 shown in FIG. 2 is illustrated to include one Kalman filter, but it is also possible that the block mode determining part 220 includes a plurality of Kalman filters according to the characteristic of the input image frame or for higher-speed motion estimation.

Figure 4:
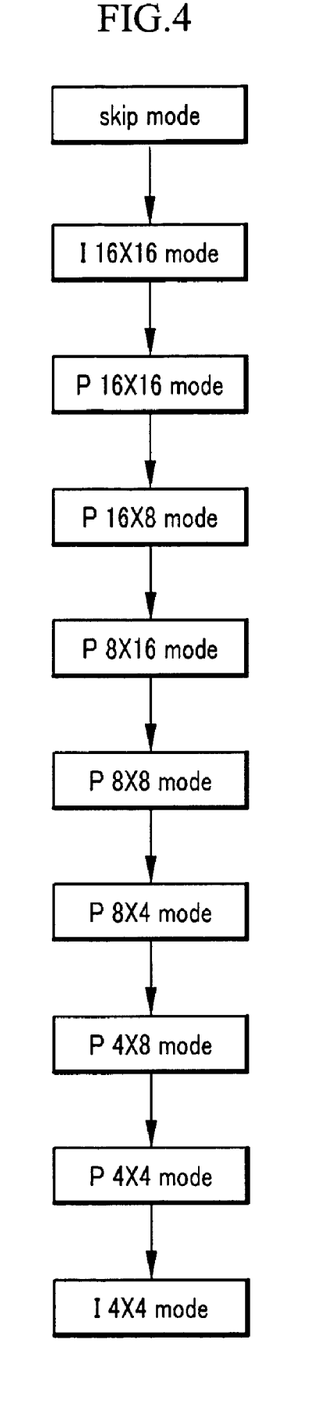
FIG. 4 shows a block mode determining sequence in the motion estimator according to an exemplary embodiment of the present invention.

FIG. 4 shows a block mode determining sequence in the motion estimator according an exemplary embodiment of the present invention. The motion estimator 200 performs the rate-distortion calculation for selecting block mode according to the sequence shown in the FIG. 3. This adopts a JVT (joint video team) encoding standard.

Hereinafter, a block mode determining method corresponding to the motion estimator 200 according to an exemplary embodiment of the present invention will be described. According to a high speed block mode selecting method according to an exemplary embodiment of the present invention, an optimal mode taking the minimum time in encoding is selected from 8 kinds of P-block modes and 2 kinds of I-block modes. Here, the Kalman filter 221 of the block mode determining part 220 is assumed to have a first filter, a second filter, and a third filter. Functions and performances of the three Kalman filters are the same, and the predicted values of the filters are estimated by Equation 6.

The filters are used in calculating the predicted cost for the image frame input to the moving picture encoding device. The predicted cost of the first filter is used when P16×16, P16×8, and P8×16 block modes are selected. Here, the predicted cost output by the first filter is indicated as $E_{min}$. The predicted cost of the second filter is used when P8×8, P8×4, P4×8, and P4×4 block modes are selected. Here, the predicted cost output by the second filter is indicated as $E_{min\_8}$. The predicted cost of the third filter is used when I16×16 and I4×4 block modes are selected. Here the predicted cost output by the third filter is indicated as $E_{min\_I}\bullet$. As described above, dividing block modes into three kinds enables a reduction in time taken in the Kalman filtering, and enables filtering results to be maintained uniformly.

Figure 5:
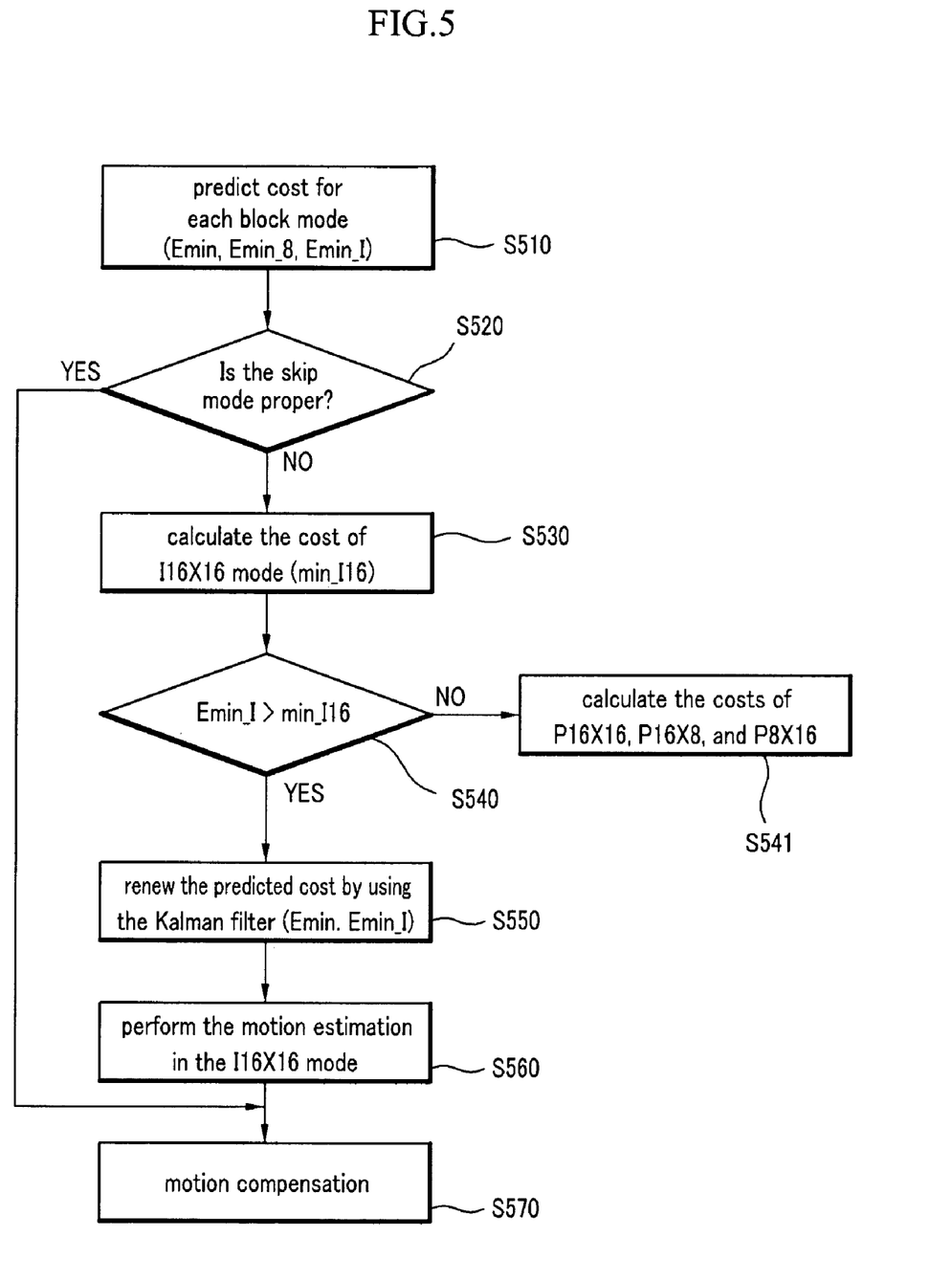
FIG. 5 is a flowchart illustrating a block mode determining method according to an exemplary embodiment of the present invention, and it shows a process in which a 16×16 mode is selected for motion estimation.

FIG. 5 is a flowchart showing the block mode determining method according to an exemplary embodiment of the present invention. It shows a process in which an I16×16 mode is selected by the motion estimator 200.

When the moving picture encoding device is reset, and a moving picture image frame is input to the moving picture encoding device for the first time, the first, second, and third filters of the Kalman filter 231 respectively calculate the predicted costs $E_{min}$, $E_{min\_8}$, and $E_{min\_I}\bullet$ for each block mode, in step S510. Here, when it is not the first time of operation, previous predicted costs, which are calculated in the previous frame by Equation 6, are used.

The motion estimator 200 analyzes the input image frame, and determines whether the rate-distortion cost after the DCT and the quantization is "0". Thereby, the motion estimator 200 determines whether it is efficient to use a skip mode when performing the motion estimation, in step S520. When the skip mode is selected, the motion estimation is finished, and data for the corresponding image frame is transmitted to the motion compensator 160, in step S570.

When the skip mode is not selected as the block mode, the motion estimation part 210 calculates a cost min—I16 of I16×16 mode by using Equations 1 to 4, in step S530. Here, the mode I16×16 is the first occurring mode according to FIG. 4.

The block mode determining part 220 determines which is larger between $E_{min\_I}\bullet$ and min_I16. When min_I16 is determined to be smaller than $E_{min\_I}\bullet$, the I16×16 mode is selected to be the optimal block mode for the motion estimation in step S540, and the predicted cost is renewed by the Kalman filtering as shown in Equation 6 in order to be used in the block mode determination for the next image frame, in step S550. Here, $E_{min\_I}\bullet$ used in the block mode determination is renewed, and the predicted cost value $E_{min}$ of the first filter is renewed in order to be used in the block mode determination for the next input image frame.

The motion compensator 160 receives the motion vector calculated based on the block mode determined in the previous step from the motion estimator 200, and performs motion compensation for the corresponding image frame in steps S560 and S570.

On the other hand, when the predicted cost value $E_{min}\_I\bullet$ is determined to be larger than min_I16, the motion estimation part 210 performs the rate-distortion cost calculation for the next block mode P16×16 according to the sequence shown in FIG. 4, in step S541. This step will be described in more detail referring to FIG. 6.

Figure 6:
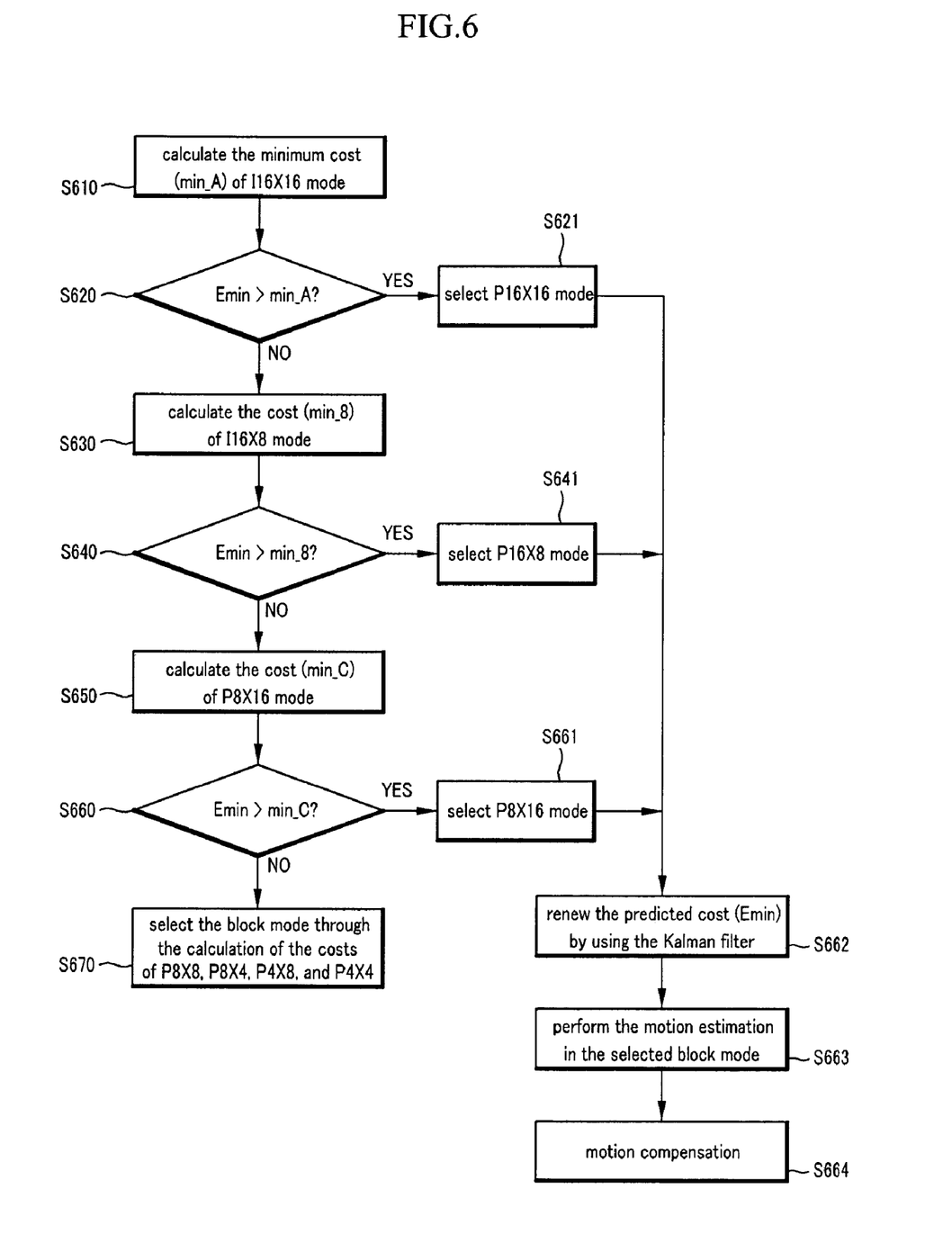
FIG. 6 is a flowchart illustrating a block mode determining method when a block mode for motion estimation is not selected by the process shown in FIG. 5.

FIG. 6 is a flowchart showing a block mode determining method for the case in which the block mode for the motion estimation has not been selected through the processes shown in FIG. 5. When the optimal block mode is not selected through the processes shown in FIG. 5, the rate-distortion cost calculations for P16×16, P16×8, and P8×16 modes are sequentially performed according to the sequence shown in FIG. 4.

When the optimal block mode is not selected through the rate-distortion cost calculation for the mode I16×16, the motion estimation part 210 calculates a cost min_A for the P16×16 mode by using Equations 1 to 4, in step S610.

The block mode determining part 220 compares the calculated cost min_A with $E_{min}$. When min_A is determined to be smaller than the calculated cost, the P16×16 mode is selected as the optimal block mode, in steps S620 and S621.

On the contrary, when $E_{min}$ is determined to be the larger, a cost min_B for the P16×8 mode which is the next one according to the sequence shown in FIG. 4 is calculated, in step S630. Similarly, the block mode determining part 220 compares the calculated cost min_B with $E_{min}$. When min_B is determined to be smaller than the calculated cost, the P16×8 mode is selected as the optimal block mode, in steps S640 and S641.

On the contrary, when $E_{min}$ is determined to be larger than min_B, the motion estimator 200 calculates a cost min_C for the P8×16 mode which is the next block mode, so the motion estimator 200 repeats the same process in steps S650, S660, and S661.

$E_{min}$ and min_C are compared with each other. When $E_{min}$ is determined to be the larger, then the optimal block mode is not selected, and the same process is repeated for the next block modes P8×8, P8×4, P4×8, and P4×4 according to the sequence shown in FIG. 4, in step S670. However, in step 670, the predicted cost $E_{min}\_8$ of the second Kalman filter is used in the optimal block mode selection, and after the block mode is selected, $E_{min}$ and $E_{min}\_8$ are renewed by using Equation 6 in order to be used in the block mode selection for the next input image frame.

The block mode determining part 220 compares the costs min_A, min_B, and min_C taken in motion estimation for each block mode with the predicted cost $E_{min}$ of the Kalman filter, and selects the optimal block mode based thereon in steps S621, S631, and S641. The block mode determining part 220 then uses the costs min_A, min_B, and min_C as new input values for the Kalman filter, and calculates the predicted cost value for the next image frame by using Equation 6 so that $E_{min}$ is renewed, in step S662. The motion estimation part 210 calculates the motion vector corresponding to the image frame based on the selected block mode, and then the motion compensator 160 performs the motion compensation based thereon, in steps S663 and S664.

Figure 7:
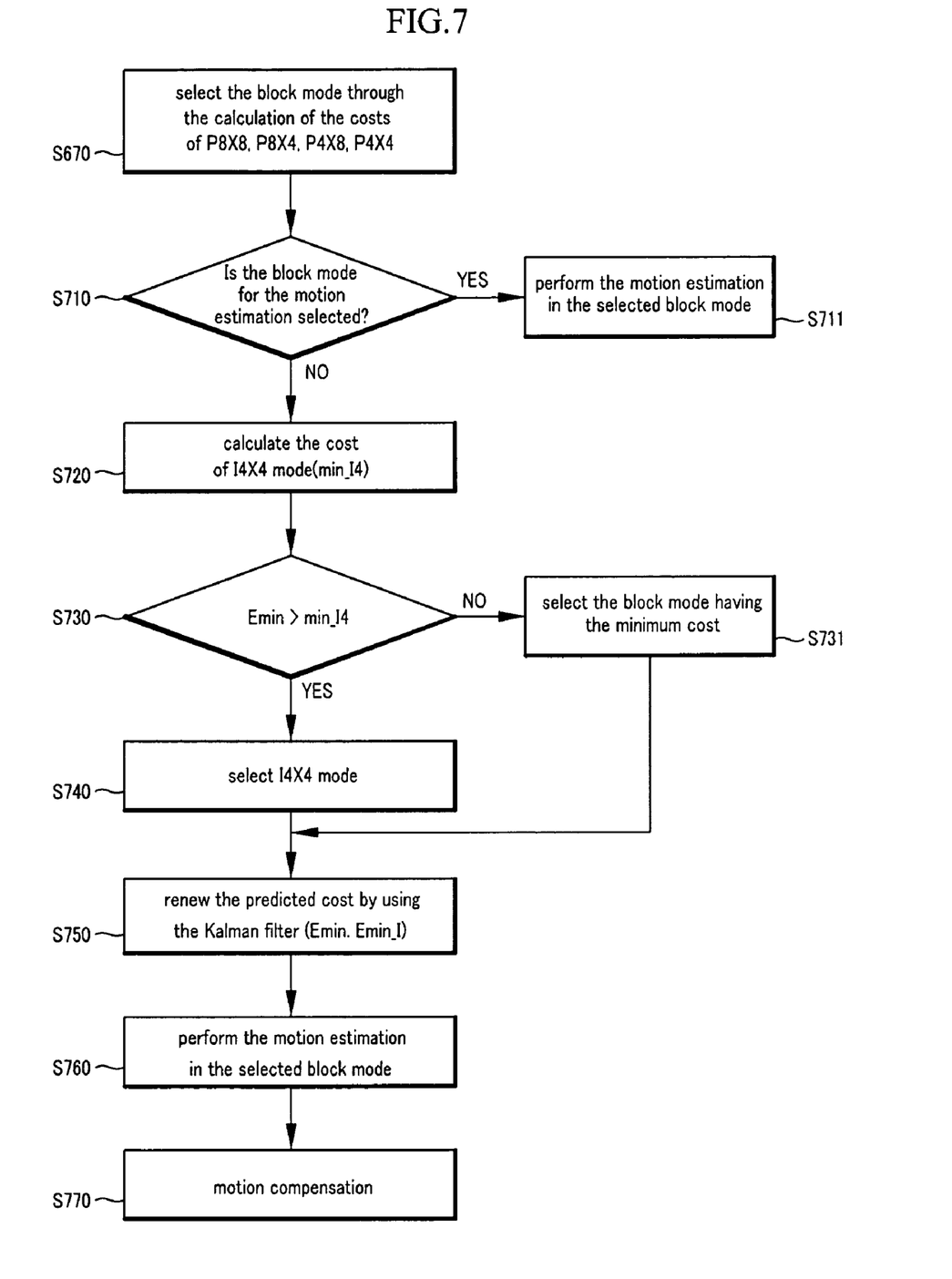
FIG. 7 is a flowchart illustrating a block mode determining method when a block mode for motion estimation is not selected by the process shown in FIG. 6.

FIG. 7 is a flowchart showing a block mode determining method for the case in which the block mode for the motion estimation is not selected through the process shown in FIG. 6. When the optimal block mode is selected by comparing the cost calculated for P8×8, P8×4, P4×8, and P4×4 modes by the motion estimation part 210 with the predicted cost obtained by the Kalman filter, the motion estimation is performed in the selected block mode in steps S670, S710, and S711.

On the other hand, when the block mode for the motion estimation is not selected, a cost min_4 for the I4×4 mode is calculated in step S720, because a calculation for the I4×4 mode has not yet been performed at that moment, according to the sequence shown in FIG. 4.

The block mode determining part 220 compares the cost min_I4 with $E_{min}\_I\bullet$, and when min_I4 is determined to be the smaller of the two, it selects the I4×4 mode as the optimal block mode, in steps S730 and S740.

The block mode determining part 220 uses min_I4 which is the minimum rate-distortion cost as a new input value for the Kalman filter, and calculates the predicted cost value through Equation 6, so that $E_{min}\_I\bullet$ and $E_{min}$ are renewed. These are used in the block mode selection for the next image frame, in step S750.

When the minimum rate-distortion cost for the I4×4 mode is determined to be larger than $E_{min}\_I\bullet$, and the optimal block mode cannot be selected, the block mode determining part 220 selects the minimum cost among the costs for all the block modes calculated in the processes shown in FIG. 5 to FIG. 7, and selects the block mode determined to have the minimum cost as the optimal block mode, in step S731.

When the block mode selection has finished the steps mentioned above, a motion vector is calculated based on the selected block mode, and the motion compensator 160 performs the motion compensation by using the calculated motion vector, in steps S760 and S770.

In the exemplary embodiment of the present invention, three Kalman filters are used in predicting the minimum rate-distortion cost for each block mode, but it is also possible to select the block mode by using one Kalman filter in calculating the predicted cost.

The present invention is also possible to be embodied as a code in a recording medium to be read by a computer. Examples of the recording medium to be read by a computer include a ROM, a RAM, a CD-ROM, a magnetic tape, a floppy disk, etc. It can be also embodied in the form of a carrier wave (e.g., transmission through the Internet). In addition, the recording medium to be read by a computer may be dispersed in a computer system which is connected by a network, and may be stored and operated in the form of a code of a dispersed type to be read by a computer.

According to the exemplary embodiments of the present invention, moving picture encoding is performed by predicting the rate-distortion cost with the Kalman filter, so that the high speed block mode estimation may be possible.

In addition, the exemplary embodiments of the present invention have advantages in that, in the H.264 moving picture encoding device, the operation load is remarkably reduced, and time waste of calculation is shortened, because it is not necessary to perform the motion estimation for all the block modes.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A motion estimation method for moving picture encoding, comprising:
   a) predicting a cost for motion estimation for an input image frame;
   b) selecting a certain block mode from a plurality of block modes used in motion estimation and calculating a cost for motion estimation for the input image frame;

c) comparing the predicted cost with the calculated cost; and
d) when the calculated cost is smaller than the predicted cost, determining the certain block mode as a block mode in which the motion estimation is to be performed, and performing the motion estimation,
wherein the cost prediction is performed by Kalman filtering, and further comprising, when the calculated cost is larger than the predicted cost in said comparing,
e) selecting another block mode from the block modes, and calculating a cost for motion estimation.

2. The motion estimation method of claim 1, wherein c) to e) are repeated until the block mode for the motion estimation for the input image frame is determined.

3. The motion estimation method of claim 2, further comprising,
when the block mode for the motion estimation for the input image frame is determined,
f) renewing the predicted cost by applying the cost calculated for the determined block mode to the Kalman filtering.

4. The motion estimation method of claim 3, wherein the renewed predicted cost is used as a predicted cost value for a next input image frame.

5. The motion estimation method of claim 2, wherein, when the predicted cost is smaller than cost calculated for each block mode after repeating c) to e) for block modes used for the motion estimation, a block mode having the smallest cost is selected.

6. The motion estimation method of claim 5, further comprising renewing the predicted cost by applying a cost calculated for the selected block mode to the Kalman filtering.

7. The motion estimation method of claim 1, wherein the calculation of a cost for a block mode is performed by using a level set method.

8. The motion estimation method of claim 1, wherein, in a), the block modes for the motion estimation are grouped into block groups, and the cost of the motion estimation for the input image frame is predicted for each block group.

9. A motion estimation device comprising:
a motion estimator for selecting one block mode from a plurality of block modes used in motion estimation for an input image frame, estimating a motion vector based on the selected block mode, and calculating a cost for the motion estimation; and
a block mode determining unit, comprising at least one Kalman filter, the block mode determining unit for predicting a cost for the motion estimation for the input image frame, comparing the cost calculated by the motion estimator with the cost predicted by the Kalman filter, and according thereto, selecting a block mode for performing the motion estimation,
wherein the motion estimator comprises:
a main pixel estimation module for estimating a motion vector of a main pixel unit for the input image frame; and
a sub-pixel estimation module for estimating a motion vector of a half-pixel unit or quarter-pixel unit with reference to the motion vector of the main pixel unit.

10. The motion estimation device of claim 9, wherein, the block mode determining unit determines a corresponding block mode as the block mode for performing the motion estimation, when the cost calculated by the motion estimator is smaller than the cost predicted by the Kalman filter.

11. The motion estimation device of claim 10, wherein the block mode determining unit groups the plurality of block modes into groups, and predicts a cost by using one Kalman filter for each group.

12. The motion estimation device of claim 10, wherein the block mode determining unit selects the block mode for performing the motion estimation of the input image frame, renews the predicted cost by using the cost calculated for the corresponding block mode as an input to the Kalman filter, and uses the renewed predicted cost to a block mode determination of a next input image frame.

13. A computer readable recording medium storing a computer program which when executed by a general purpose computer comprises:
a) predicting a cost for motion estimation for an input image frame by Kalman filtering;
b) selecting a certain block mode from a plurality of block modes used in motion estimation and calculating a cost for motion estimation for the input image frame;
c) comparing the predicted cost with the calculated cost; and
d) when the calculated cost is smaller than the predicted cost, determining the certain block mode as a block mode in which the motion estimation is to be performed, and performing the motion estimation,
further comprising, when the calculated cost is larger than the predicted cost in said comparing,
e) selecting another block mode from the block modes, and calculating a cost for motion estimation.

14. The computer readable recording medium defined by claim 13, further comprising,
when the block mode for the motion estimation for the input image frame is determined, f) renewing the predicted cost by applying the cost calculated for the determined block mode to the Kalman filtering.

15. The computer readable recording medium defined by claim 14, wherein the renewed predicted cost is used as a predicted cost value for a next input image frame.

16. The computer readable recording medium defined by claim 14, wherein, when the predicted cost is smaller than cost calculated for each block mode after repeating c) to e) for block modes used for the motion estimation, a block mode having the smallest cost is selected.

* * * * *